April 12, 1966          J. J. ROZMUS          3,246,184

ROTATABLE CONSTANT RATIO TRANSFORMER

Filed Aug. 1, 1963

INVENTOR: JOHN J. ROZMUS

United States Patent Office 3,246,184
Patented Apr. 12, 1966

3,246,184
ROTATABLE CONSTANT RATIO TRANSFORMER
John J. Rozmus, Berwyn, Pa., assignor to Harowe Servo Controls Inc., West Chester, Pa., a corporation of Pennsylvania
Filed Aug. 1, 1963, Ser. No. 299,364
2 Claims. (Cl. 310—68)

This is a continuation-in-part of application Serial No. 101,793 filed April 10, 1961, now abandoned.

This invention relates to dynamo electric machines, especially self-synchronous motors and generators, and has for an object the provision of a rotatable transformer of constant ratio for supplying power to the rotator windings.

In my parent application Serial No. 101,793, filed April 10, 1961, abandoned in favor of the present application as a continuation-in-part thereof, there is presented a discussion of the difficulties encountered incident to the use of brushes in rotary electric machinery. Transients incident to arcing at the brushes are particularly disadvantageous in machines of the type frequently referred to as synchros.

It is an object of the present invention to provide in a synchro machine, a rotatable transformer of constant ratio in which the copper losses in the primary winding have been greatly reduced.

In carrying out the invention in one form thereof, there is utilized an end cap of the machine, made of high permeability material, not only as a closure member for one end of the machine and for the support of bearing structure, but also as a part of the flux path for the stationary winding of the transformer, which by reason of the enlarged space thereby made available within the motor housing permits an increase in the volume of copper comprising the windings with the result that copper losses are reduced by as much as 50%.

Figure 1:
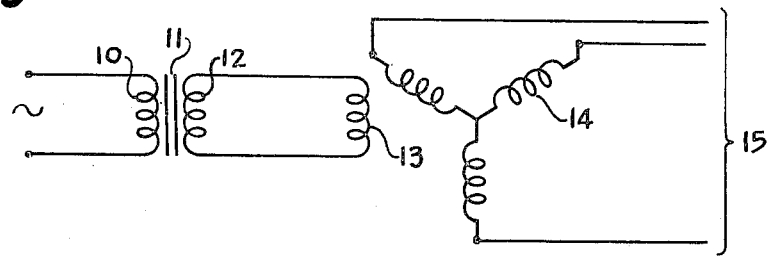
Figure 2:
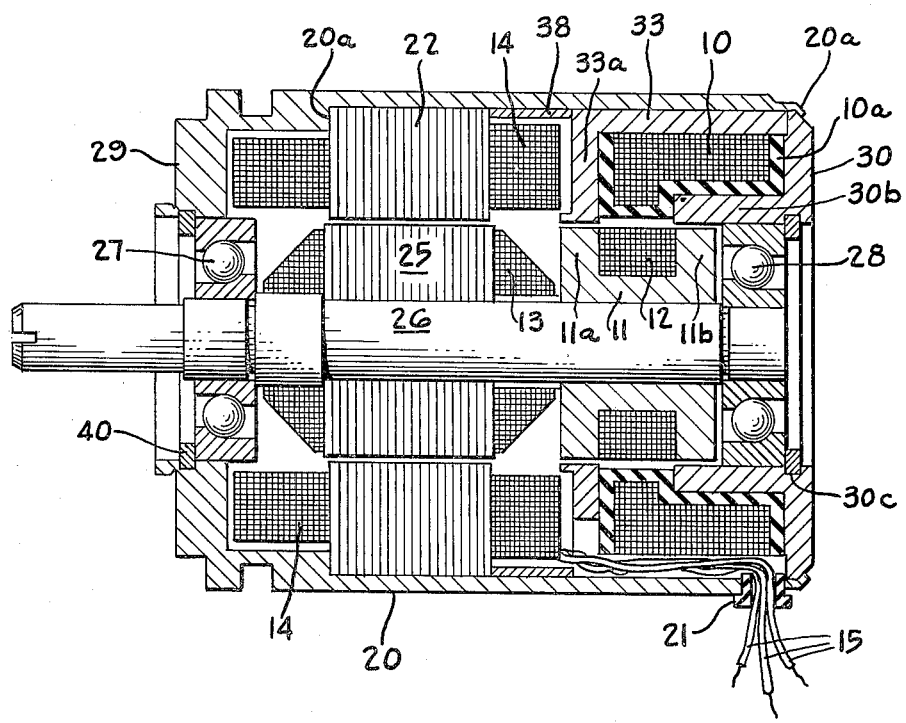

For further objects and advantages of the invention and for details of a preferred embodiment thereof, reference is to be had to the following description taken in conjunction with the accompanying drawing, in which:

FIG. 1 diagrammatically illustrates the electrical connections of a typical synchro; and FIG. 2 illustrates in a sectional view of such a synchro a preferred embodiment of the invention.

Referring now to FIG. 1, the primary winding 10 of a rotary transformer is shown connected to a suitable source of alternating current supply. The core structure 11 provides a uniform coupling between the primary winding 10 and a secondary winding 12. The secondary winding 12 is connected to the rotor winding 13 of the selsyn or synchro, the stationary winding 14 of which is illustrated as comprising three Y-connected coils.

As shown in FIG. 2, the leads 15 from the Y-connected coils 14 are withdrawn through an opening in a housing 20 through a suitable insulating member 21. Disposed in abutting relation with the interior of the housing 20 and against a shoulder 20a of the housing are the magnetic laminations 22 of the stator having extending therethrough the Y-connected coils 14. Extending through a central cylindrical opening of the stator is a conventional rotor 25 carrying in conventional manner the winding 13. The rotor is mounted on a shaft 26 supported in bearing elements 27, 28, themselves supported by end caps 29 and 30. The end cap 30 is of special construction, as will later be explained. Disposed within the space between the bearing element 28 and the rotor 25 is the laminated structure 11 of the rotatable element of the transformer. These laminations support within an annular recess, the secondary winding 12. The rotatable element 12 of the transformer is suitably secured to the shaft 26. A spacing ring 38 has a close fit within the interior of the housing and serves to space from the core structure 22, an annular core 33 of the primary winding 10 of the rotary transformer. This core member 33 which may be made of a high permeability material has a leg 33a arranged opposite a leg 11a of the rotary core structure 11.

In order to provide the maximum volume for the coil 10 within the available space, it will be seen that a unique arrangement includes the provision of the end cap 30 also made of high permeability material. Thus, this end cap 30 it L-shaped in cross-section with the axially extending leg bearing against the right-hand portion of the core structure 33 and the inwardly extending leg 30b forming an annular pole structure for cooperation with the annular leg 11b of the rotating core structure 11. The coil or winding 10 is preferably wound on a form 10a of insulating material. Thus, it can be inserted as a unit into the structure and held in place by the end cap 30. The end cap itself is secured in place by rolling over the edge of the end of the housing 20, this rolled over edge 20a being from a thinner portion of the housing. It provides secure retainment of the several parts in their illustrated positions.

The end cap 30 has a locking recess 30c for reception of a retaining ring for the bearing structure 28 in which the shaft 26 is journaled. A retaining ring 40 secures in place the bearing structure 27 for the opposite end of the shaft 26.

By reason of the utilization of all of the available space within the housing 20 and by reason of the double functions performed by the end cap 30 both as a closure and bearing supporting member as well as a flux transmitting member, the volume of copper for the primary winding may be greatly increased over that attained with prior designs. By increasing the volume of the copper, the copper losses of the unit are greatly reduced, as much as 50% over those attained in accordance with the structure of my aforesaid prior application Serial No. 101,793 and 50% less copper losses than other competing devices available on the market.

In summary, the synchro machine or selsyn of my invention including the rotary transformer is characterized by the provision of the rotatable annular core having a U-shape in the cross-sectional view and with two legs extending radially outward with the secondary winding of the transformer closely fitting within these two radially extending legs. The remaining core structure of the transformer is stationary and is made up of two L-shaped members. The first is annular and of L-shape in cross-section, one leg 33a extending radially inward in complementary relation to the outwardly extending leg 11a of the secondary core structure 11. The core structure of the stator includes also an axially extending part which terminates short of the end of the housing 20. Against the end of this axial part abuts the end cap which is held in place by spinning down the end portion of the cap. This end cap 30 has provision for support of an end bearing and also includes an axial part extending inwardly of the motor and into complementary relation with the outwardly radially extending leg 11b. It is in this manner that the parts 30 and 33 of high permeability material cooperate together to form the maximum volume for the windings and to achieve the advantages already set forth at length.

What is claimed is:

1. The combination with a synchro machine having a rotor winding and stator winding, of a rotary transformer having a secondary winding directly connected to said rotor winding and having a primary winding disposed within a common housing structure, said rotary transformer being characterized by the provision of a rotatable annular core member having two outwardly extending legs between which the secondary winding of the rotary transformer is disposed and by the provision of core structure for the primary winding having two L-shaped portions, the first of which has a part which extends radially for cooperation with one leg member of the core structure of said secondary winding and another part which extends axially of the motor, the second of said L-shaped portions having a part which extends radially, said last-named part forming and end cap for the synchro machine and being pressed tightly into engagement with said axially extending portion of the first-mentioned L-shaped portion, said second of said L-shaped portions having an inwardly extending axial portion extending into cooperation with the second of said outwardly extending legs, thereby to provide an enlarged volume within which said secondary winding may be disposed, the increased amount of copper available for said primary winding reducing the copper losses thereof.

2. A synchro machine comprising a rotor and a stator, each provided with windings, a rotary transformer having rotary core structure forming poles of annular configuration between which there is disposed the secondary winding of said transformer, stationary pole structure having an annular extension extending radially to cooperate with one of the annular poles of said rotary structure and having an axially extending portion extending to a position approximating the end of a common housing for said synchro machine and its rotary transformer, an end cap for said housing formed of high permeability material, said end cap having a radially extending portion abutting against the axially extending portion of said stator core structure and also having an inwardly and axially extending leg portion for cooperative relationship with the radially extending pole structure of said secondary winding, a primary winding disposed within the enclosure formed by said stationary pole structure and having an axial length approximately twice that of said secondary winding of said transformer for reduction of the copper losses thereof.

References Cited by the Examiner

UNITED STATES PATENTS

| | | | |
|---|---|---|---|
| 1,394,901 | 10/1921 | Hobart | 310—68 X |
| 2,432,982 | 12/1947 | Braddon et al. | 310—68 X |
| 3,141,101 | 7/1964 | Ketay | 310—68 X |

ORIS L. RADER, *Primary Examiner.*